United States Patent [19]

Lamond

[11] 4,336,219

[45] Jun. 22, 1982

[54] METHOD FOR PELLETIZING SILICA

[75] Inventor: Trevor G. Lamond, Borger, Tex.

[73] Assignee: J. M. Huber Corporation, Locust, N.J.

[21] Appl. No.: 176,893

[22] Filed: Aug. 11, 1980

[51] Int. Cl.$^3$ ............................................. B01J 2/06
[52] U.S. Cl. ................................................. 264/117
[58] Field of Search ........................................ 264/117

[56] References Cited

U.S. PATENT DOCUMENTS 3,646,183  2/1972  Topcik ............................ 264/117
4,087,254  5/1978  Takewell ......................... 264/117

OTHER PUBLICATIONS

Grant, J., Chemical Dictionary, 4th ed., McGraw-Hill Book Co., N.Y. 1969, p. 40.

*Primary Examiner*—James R. Hall
*Attorney, Agent, or Firm*—Robert L. Price; Harold H. Flanders

[57] ABSTRACT

A method of making pellets from silica, sodium silicates and sodium aluminosilicates by pelletizing the materials in the presence of ammonium stearate. Upon removal from the pelletizer, the formed pellets are dried.

4 Claims, No Drawings

METHOD FOR PELLETIZING SILICA

BACKGROUND OF THE INVENTION

In general, the present invention relates to pelletizing siliceous materials. More especially it relates to forming soft pellets of siliceous materials useful in rubber applications.

When silica is pelletized with water, the resulting pellets are hard and do not disperse easily in use applications. When the same silica is pelletized with an organic liquid, the resulting pellets are soft and readily disperse in all applications but it is uneconomical to use organic liquids to pelletize silica. It would be preferable to find a way of producing silica pellets which are soft and easily dispersible without the use of an organic liquid.

SUMMARY OF THE INVENTION

Accordingly, it is an object of this invention to provide a new and highly effective method which overcomes the deficiencies of the prior art as described above.

Another object of the present invention is to provide a method to produce spherical, free-flowing, siliceous pellets which are easily dispersible in use applications without the use of organic solvents in a pelletizing step.

Still another object of the present invention is to provide a method to produce siliceous pellets which are easily dispersible in use applications and which contain no other components besides the siliceous material, water and a rubber or plastic compounding ingredient.

Other objects and a fuller understanding of this invention may be had by referring to the following description and claims.

The present invention overcomes the deficiencies of the prior art and achieves its objectives by passing a siliceous material, preferably silica, into a pelletizer where it is pelletized in the presence of from 0.1 to 5% ammonium stearate by weight of the siliceous material, preferably 0.5% to 2%, to form pellets of the siliceous material, then removing pellets from the pelletizer and drying. Preferably the pelletizer is a pin mixer.

DESCRIPTION OF THE PREFERRED EMBODIMENTS

In the broadest aspect of the present invention, soft pellets of siliceous product are produced by pelletizing the siliceous product in the presence of ammonium stearate.

In a preferred embodiment of the present invention, silica is passed to a pin mixer. A 33% by weight ammonium stearate suspension is added to the water entering the pin mixer at a rate sufficient to add from 0.5 to 2% of ammonium stearate by weight of the silica. The silica is pelletized in the presence of diluted ammonium stearate aqueous suspension in the pin mixer to form pellets of silica surface treated with ammonium stearate, removing the treated silica pellets from the pin mixer, and drying the treated silica pellets.

The siliceous material can be silica, sodium silicates and sodium alumino silicates. Preferably the siliceous material is a hydrated, precipitated silica.

An example of a silica useful in the present invention is Zeosyl 100 (a registered trademark of the J. M. Huber Corporation). This silica is a hydrated silicon dioxide having a density at 25 degrees Celsius of 2.0 g/ml; a mean particle diameter of 14–22 microns; an oil absorption of from 170 to 200 cc oil/100 g; and a B.E.T. surface area of from 120 to 150 sq. m/g.

The siliceous material is formed into pellets to increase the bulk density and flowability of the product and to cut down on dust problems. The agglomeration techniques useful in the present invention include the use of pin mixers, pelletizing drums, pelletizing disks, pelletizing cones and multi-cone pelletizers. A preferred embodiment is agglomerating the siliceous material in a pin mixer.

The ammonium stearate suspension is contained in the pelletizing water such that the ammonium stearate represents a weight of from 0.1 to 5% by weight of siliceous material. Preferably the ammonium stearate represents a weight of from 0.5% to 2% by weight of the siliceous material. One obtains beneficial results with as little as 0.01% ammonium stearate; more than 2% would work but is not needed and gives no increased beneficial effect.

The amount of ammonium stearate added to the silica is varied by varying the amount of ammonium stearate aqueous suspension added to the pin mixer water. The pin mixer water requirement is fixed for each particular silica type, depending on the percent wet cake moisture of the product.

While the applicant does not wish to be bound by any particular theory as to how his invention works, it is thought that water dissolves a portion of the surface silica and, on drying, the dissolved silica precipitates out and cements the particles together. Treatment of the silica with ammonium stearate makes the silica hydrophobic (water-hating) and thereby reduces the affinity of silica towards water. It is believed that the ammonium stearate reduces the interaction between the water and silica and prevents partial solubilization of the silica by the water.

By using an aqueous ammonium stearate suspension to pelletize the siliceous material, one obtains soft pellets which are readily dispersible in use applications. Also because the only material that ends up in the pellets besides the silica and water is stearic acid formed by the decomposition of the ammonium stearate on drying, no other materials are present. Therefore, one is only adding a desirable compounding ingredient.

The siliceous pellets of the present invention are useful as reinforcing pigments in elastomers, as fillers and brightening agents in paper and paints, and as flow conditioners. Although some surface active agents have an adverse effect on the reinforcing properties of rubber products, stearic acid has no such adverse effect.

EXAMPLES

The invention will be further illustrated by the following examples which set forth particularly advantageous method and composition embodiments. While the examples are provided to illustrate the present invention, they are not intended to limit it.

In Examples I through V, a hydrated silica was passed to a laboratory pin mixer. A 33% ammonium stearate suspension is added to the pin mixer water and introduced into the pin mixer so that the ammonium stearate is at a level of from 0.5 to 2% by weight of the silica. The silica was pelletized in the presence of the ammonium stearate to form treated silica pellets. The treated silica pellets were removed from the pin mixer and dried at a temperature of 125 degrees Celsius.

Examples I through V are examples of the present invention, but the Control Example is not. In the Control Example, the silica was pelletized in a pin mixer in the presence of water alone, the silica pellets were then removed from the pin mixer and dried at a temperature of 125 degrees Celsius. The results are shown in Table I. Pellet hardness was measured by the procedure outlined in ASTM D3313-74.

TABLE I

EFFECT OF AMMONIUM STEARATE ADDITION ON SILICA PELLETS

|  | EXAMPLES | | | | | |
| --- | --- | --- | --- | --- | --- | --- |
|  | Control | I | II | III | IV | V |
| Ammonium Stearate, % | 0 | 0.5 | 1 | 1 | 2 | 2 |
| Pellet Hardness, grams | | | | | | |
| Average | 107 | 73 | 52 | 41 | 36 | 20 |
| High | 180 | 107 | 72 | 78 | 72 | 30 |
| Low | 65 | 54 | 21 | 32 | 14 | 12 |

Thus, in operation, the average pellet hardness decreases as more ammonium stearate is added to the system.

Because of their low pellet hardness, silica pellets formed in the presence of ammonium stearate are easily dispersible in use applications. These pellets are formed without the use of expensive organic solvents in the pelletizing step, and the resulting product contains no other components besides silica, water and a compounding ingredient. Note that the by-product of using ammonium stearate in pelletizing silica is a compounding ingredient (stearic acid) which has advantageous effects in its end use.

While the present invention has been described with reference to specific embodiments, this application is intended to cover those various changes and substitutions which may be made by those skilled in the art without departing from the spirit and scope of the appended claims.

I claim:

1. A method for forming pellets of a particulate siliceous material selected from the group consisting of silica, sodium silicates and sodium aluminosilicates, by pelletizing in aqueous medium in a pelletizer, the steps comprising:
   (a) passing said siliceous material to a pelletizer;
   (b) passing an ammonium stearate aqueous suspension into said pelletizer so that the ammonium stearate is present in the pelletizer at a level of from 0.1 to 5% by weight of the siliceous material;
   (c) pelletizing said siliceous material in the presence of said ammonium stearate in said pelletizer to form pellets of siliceous material;
   (d) removing said pellets from said pelletizer; and
   (e) drying said pellets.

2. A method of forming pellets of siliceous material according to claim 1 wherein said siliceous material is silica.

3. A method of forming pellets of siliceous material according to claim 1 wherein said pelletizer is a pin mixer.

4. A method of forming pellets of siliceous material according to claim 1 wherein said ammonium stearate in step (b) of claim 1 is at a level of from 0.5 to 2% by weight of the siliceous material.

* * * * *